United States Patent [19]

Dimas

[11] Patent Number: 5,314,626
[45] Date of Patent: May 24, 1994

[54] METHOD FOR THE ALTERATION OF SILICEOUS MATERIALS FROM BAYER PROCESS LIQUIDS

[75] Inventor: Peter A. Dimas, Wheaton, Ill.

[73] Assignee: Nalco Chemical Company, Naperville, Ill.

[21] Appl. No.: 925,222

[22] Filed: Aug. 3, 1992

Related U.S. Application Data

[63] Continuation-in-part of Ser. No. 811,723, Dec. 23, 1991, abandoned.

[51] Int. Cl.$^5$ .............................................. C01F 7/02
[52] U.S. Cl. .................................. 210/698; 210/696; 423/121
[58] Field of Search .................. 210/696, 698–701, 210/702, 725, 727, 728, 729, 737; 423/121, 122, 130

[56] References Cited

U.S. PATENT DOCUMENTS

| | | | |
|---|---|---|---|
| 2,106,196 | 1/1938 | Weston | 210/696 |
| 3,671,447 | 6/1972 | Kowalski | 210/698 |
| 3,671,448 | 6/1972 | Kowalski | 210/700 |
| 4,016,075 | 7/1977 | Wilkins | 210/714 |
| 4,328,106 | 5/1982 | Harrar et al. | 210/700 |
| 4,405,461 | 9/1983 | Rogers | 210/698 |
| 4,532,047 | 7/1985 | Dubin | 210/698 |

FOREIGN PATENT DOCUMENTS 57-110398  7/1982  Japan .................................. 210/698

OTHER PUBLICATIONS

"Control of Silica in the Bayer Process Used For Alumina Production", S. Ostap Canadian Metallurgical Quarterly, vol. 26, No. 2 p. 101.

"Behavior of Silica in Sodium Aluminate Solutions", R. G. Breur, L. R. Barsotti, A. C. Kelly, AIME Int'l. Aluminum Symposium, NY, Feb. 18–22, 1962.

"Scaling in Bayer Plants", G. Roach, J. Cornell, CHEMECA 85, Paper B7A.

"Review on the Study of Scales Formed on Equipment During Alumina Production Process", Wang Yajun, Ke Jiajun, Institute of Chemical Metallurgy, vol. 9 No. 4, Nov., 1988 CA 110 (18): 158158g.

"Heating and Evaporation of Silicon Containing Aluminate Solutions", V. G. Kazakov, N. G. Potapov, A. E. Bobrov (USSR) CA:92 61106K.

Primary Examiner—Peter Hruskoci
Attorney, Agent, or Firm—Robert A. Miller; Joseph B. Barrett

[57] ABSTRACT

Siliceous materials produced by thermally treating Bayer process liquors are obtained in modified form when produced in the presence of ammonium, aromatic amine, and amine compounds, or compounds bearing ammonium, aromatic amine or amine moieties, such as N-propylamine, pyridine and tetramethylammonium hydroxide. These modified siliceous materials possess morphologies which confer upon them a reduced tendency to deposit on surfaces throughout the process.

15 Claims, 15 Drawing Sheets

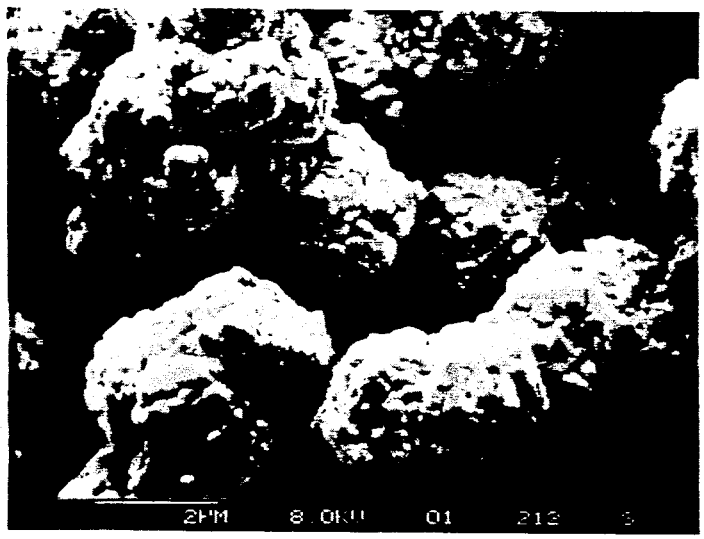
FIG. IC  10,000 X
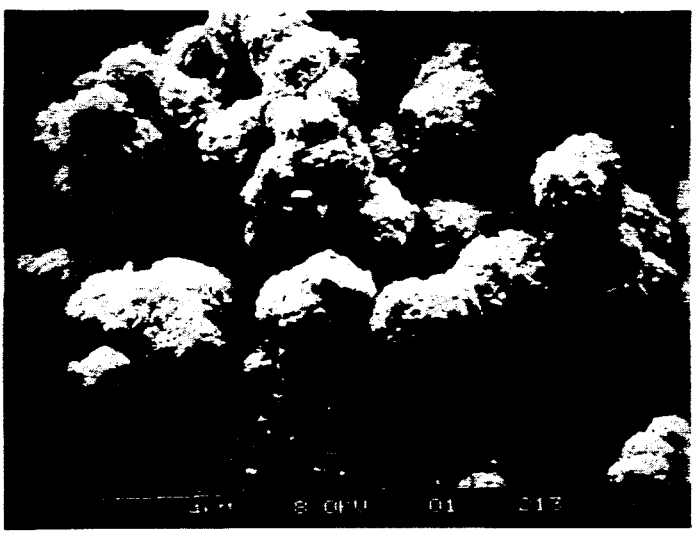
FIG. IB  5000 X
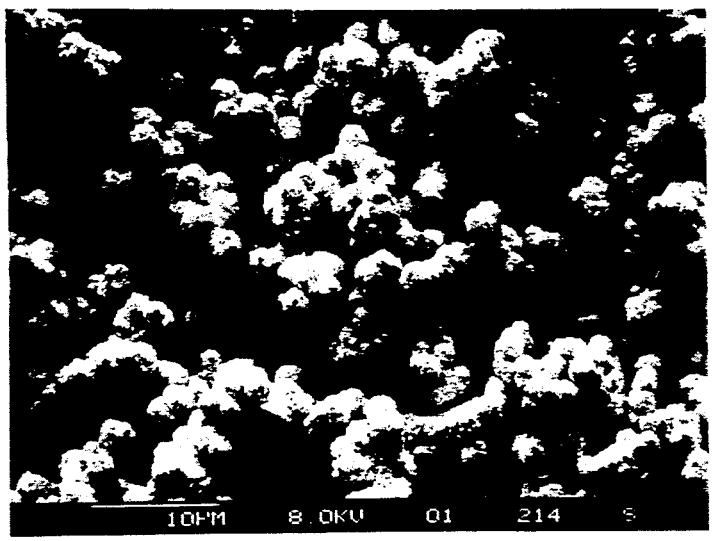
FIG. IA  2000 X

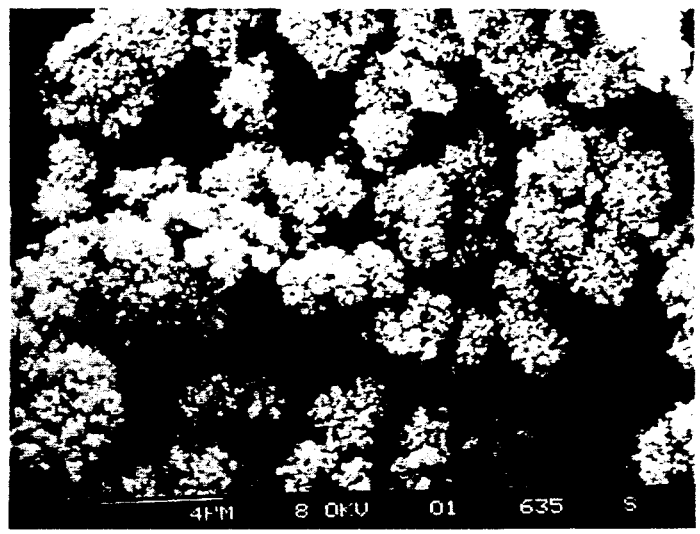
FIG. 2C 5000 X
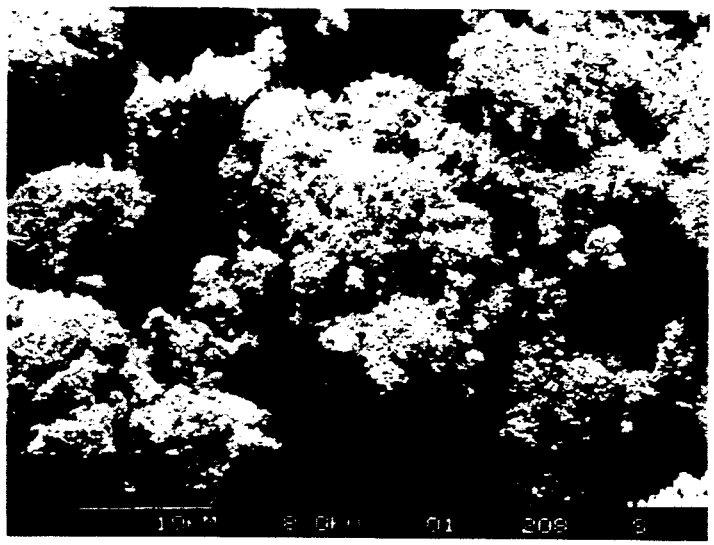
FIG. 2B 2000 X
FIG. 2A 5000 X

2000 X
500 ppm treatment

5000 X
100 ppm treatment

2000 X
Treatment with tetramethylammonium bromide, 2500 ppm

2000 X
Treatment with tetramethylammonium nitrate, 2500 ppm

2000 X
Treatment with ammonium hydroxide, 2500 ppm

2000 X
Treatment with hydroxylamine, 2500 ppm

5000 X

5000 X

METHOD FOR THE ALTERATION OF SILICEOUS MATERIALS FROM BAYER PROCESS LIQUIDS

This is a continuation-in-part of co-pending application Ser. No. 07/811,723 filed on Dec. 23, 1991 now abandoned.

BACKGROUND OF THE INVENTION

Alumina trihydrate (also known as aluminum hydroxide, alumina, and gibbsite) is produced on an industrial scale in the Bayer process. In this process, a raw ore commonly known as bauxite is contacted with hot caustic soda solution. This results in the dissolution (digestion) of a considerable portion of the aluminum-bearing minerals, affording a supersaturated solution of sodium aluminate (pregnant liquor). After the physical separation of undigested mineral residues (red mud), the sodium aluminate solution is decomposed to afford alumina trihydrate, which is recovered by filtration. This precipitation step is promoted by the addition of fine alumina trihydrate seed crystals. The depleted or spent liquor from this precipitation is then reconstituted and recycled extensively, accumulating a variety of inorganic and organic species over time.

The bauxite ores used in this process are found in many parts of the world, and the composition of the ore varies from one location to the next. Generally, bauxites are composed of mixtures of inorganic minerals including oxides and hydroxides of the elements aluminum, iron, titanium and silicon, silicates and aluminosilicates (clays), and organic matter.

During the digestion of bauxite ore, the attack of caustic soda on certain silica-bearing components in the ore results in the release of soluble silicate species into the liquor. These soluble silicates then react with alumina and soda to form insoluble sodium aluminosilicates which are also known as desilication products, or DSP.

Silica present in bauxite as clays is particularly susceptible to dissolution by caustic attack. Silica in this form can constitute as much as 5% of the total mass of the bauxite. Silica present as quartz is more resistant to caustic attack and dissolution, and can constitute as much as 10% of the total mass of the bauxite.

The chemical composition of desilication products can vary from one plant to the next owing to differences in plant operating conditions and liquor chemistry. Furthermore, desilication product compositions can vary within a particular plant, depending on the processing temperature and chemical composition at any given point. Nevertheless, many of the desilication products described in the literature conform approximately to the general formula for the sodalite family of minerals:

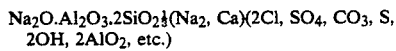

$Na_2O.Al_2O_3.2SiO_2\frac{1}{3}(Na_2, Ca)(2Cl, SO_4, CO_3, S, 2OH, 2AlO_2, etc.)$ Sodalite itself is the chloride mineral, whereas the sulfate and carbonate forms are known as noselite and cancrinite, respectively. Quite often, desilication product samples are found to be physical mixtures of several of these compounds. Deviations from the stoichiometry of the general sodalite formula are commonly observed. For example, deficiencies in the amount of soda compared with that expected for a true sodalite have been attributed to the replacement of sodium by hydrogen from wash water.

Much of the desilication product exits the plant in the red mud, but a significant portion of soluble silica remains in the pregnant liquor. A small but significant amount of this silica appears as a contaminant in the alumina trihydrate. Furthermore, desilication product is deposited as scale on the walls of pipes and vessels throughout the plant. Scaling by DSP is particularly severe on heated equipment surfaces, such as heat exchanger tubes.

The presence of large quantities of soluble siliceous species in Bayer liquors and their subsequent transformation into insoluble desilication products is detrimental to the operation of the Bayer process, and therefore, undesirable for several reasons. From the general sodalite formula, it is evident that potentially saleable alumina and costly soda are diverted into desilication products. As the recovery of the alumina and soda is not economically viable, these diversions constitute substantial process losses which are economically significant on an industrial scale. Furthermore, the deposition of desilication products on process equipment surfaces such as on the walls of heat exchanger tubes and pipes reduce their operating efficiencies. For example, the flow of fluids through pipes can be impeded by the accumulation of desilication products as scale on the pipe walls. In heat exchangers, scaling of the tubing walls by desilication products can seriously impede the transfer of heat from the steam side which furnishes heat, to the process liquor which is being heated. The removal of such scales is accomplished by manual and/or chemical means, both of which constitute additional costs to the plant.

The negative impact of desilication products on alumina quality and on Bayer Process efficiency and economics has prompted alumina producers to devise methods for mitigating these detrimental effects.

Much effort has been directed at developing processing methods, which are practiced in conjunction with the digestion of bauxite and which promote the dissolution of the siliceous constituents of bauxite and the subsequent precipitation of desilication products to the greatest extent possible. By depleting the liquor of silica at this stage, the potential for scaling downstream is thereby reduced. For example, the temperature or time of digestion may be increased to promote the desilication reactions. In addition, low-silica bauxites may be subjected to a predigestion desilication step in which a concentrated spent liquor slurry of ground bauxite is held at close to atmospheric boiling temperature for periods of 8-24 hours. By this method, fine, high-surface area desilication product seed is formed. When combined with the main digestion slurry, this seed is very effective in promoting the crystallization of desilication product. To raise the concentration of silica above the supersaturation level beyond which desilication products will form, it may also be necessary to add a clay or other siliceous materials in the digestion or predigestion desilication steps. These methods have been summarized in articles such as "Control of Silica in the Bayer Process Used For Alumina Production," S. Ostap, Canadian Metallurgical Quarterly, Vol. 25, No. 2, pp. 101-106.

In addition, a wide variety of inorganic salts and compounds, such as oxides, hydroxides, silicates, aluminates, and other forms of calcium, magnesium, and barium have been employed to control desilication of Bayer liquors.

The use of organic treatments to control deposition of desilication products on equipment surfaces is a relatively unexplored area. A hydrophobic organosilicon liquid polymer has been reported to inhibit the formation of scales during heating and evaporation of aluminate liquors (Kazakov, V. G., Potapov; N. G.; Bobrov, A. E., *Tsvetn. Met.*, 1979, (1), 45–48). The same treatment method is reported in Wang, Yajun; Ke, Jiajun, *Huagong Yejin*, 9(4), 66–72, 1988.

The use of additives to render equipment surfaces resistant to scale adhesion in slurry heat exchangers conveying bauxite ore slurries is mentioned in Liu, Zigao; *Huagong Yejin*, 11(4), 326–32, 1990.

None of the art with which the applicant is familiar discloses the use of specific classes of organic nitrogenous compounds to modify the morphology of desilication products and thereby reduce their tendency to adhere to equipment surfaces. Nor is there art that indicates the stabilization of siliceous species in Bayer liquor by tetramethylammonium hydroxide, or any other treatment type.

SUMMARY OF THE INVENTION

The present invention provides a method of treating Bayer Process liquor containing siliceous components. The method includes the steps of adding an effective amount of at least one ammonium compound to Bayer Process liquors including doluble silica species having the structure:

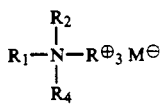

wherein: $R_1$, $R_2$, $R_3$, and $R_4$ are, individually, a straight or branched chain $C_1-C_6$ aliphatic group, a straight or branched chain $C_1-C_6$ carboxyl group, an aromatic group, an alkyloryl group, a hydroxyl group, a branched or straight chain $C_1-C_6$ hydroxyalkyl group, or a hydrogen atom; and M is an anion. Preferably, M is a halogen, phosphate ion, nitrate, or hydroxyl ion. Preferably, $R_1$, $R_2$, $R_3$ and $R_4$ are, individually, a straight chain $C_1-C_3$ alkyl group and M is a hydroxyl ion.

The invention also provides a method of treating Bayer Process liquors containing soluble silica species with an effective amount of at least one amine compound having the following structure:

wherein $R_5$, $R_6$, and $R_7$ are, individually, a straight or branched chain $C_1-C_6$ aliphatic group, a straight or branched chain $C_1-C_6$ carboxyl group, a branched or straight chain hydroxyalkyl group, a hydroxyl group, an aromatic group, an alkyloryl group, or a hydrogen atom. Preferably, $R_5$, $R_6$ and $R_7$ are, individually, a straight chain $C_1-C_4$ alkyl group. According to one embodiment of the invention, the alkyl group is a phosphonic acid.

Another aspect of the invention provides a method of treating Bayer Process liquors containing soluble silica species with an effective amount of at least one aromatic amine compound having the following structure:

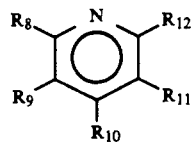

wherein $R_8$, $R_9$, $R_{10}$, $R_{11}$ and $R_{12}$ are, individually, a straight or branched chain $C_1-C_6$ aliphatic group, a $C_1-C_6$ straight or branched chain carboxyl group, a hydroxyl group, a straight or branched chain $C_1-C_6$ hydroxyalkyl group, or a hydrogen atom. According to one embodiment of the invention, the aromatic amine is pyridine.

The effective amount of the added compounds above induces the formation of insoluble siliceous materials, also known as desilication products, having modified chemical and/or morphological characteristics. According to one preferred embodiment of the invention, the effective amount of the compound is 100 to about 10,000 parts per million of the Bayer Process liquor.

The present invention further provides a method of reducing the formation of insoluble siliceous deposits during the thermal treatment of Bayer process liquor, the method including the step of treating the liquor prior to or during the thermal treatment with an effective amount of at least one of the ammonium or amine compounds described above.

BRIEF DESCRIPTION OF THE DRAWINGS

FIGS. 1A, 1B and 1C are electron micrographs of desilication product crystals from precipitation studies conducted in the presence of tetramethylammonium hydroxide, 5,000 parts per million; FIG. 1A 2,000 times magnification; FIG. 1B 5,000 times magnification; and FIG. 1C 10,000 times magnification.

FIGS. 2A, 2B and 2C are electron micrographs of desilication product crystals from precipitation studies conducted without additives; FIG. 2A magnification 5,000 times; FIG. 2B magnification 2,000 times; FIG. 2C magnification 5,000 times.

FIG. 5 is an electron micrograph of desilication product crystals from precipitation studies conducted with tripropylamine, 2,500 parts per million at 5,000 times magnification.

FIG. 9A, tetramethylammonium nitrate 2,500 ppm at 2,000 magnification; FIG. 9B, tetramethylammonium bromide 2,500 ppm at 2,000 times magnification;

FIG. 10 is an electron micrograph of desilication product crystals from precipitation studies conducted with methyltributylammonium hydroxide 2,500 ppm at 5,000 times magnification;

DESCRIPTION OF THE PREFERRED EMBODIMENTS

Figure 3:
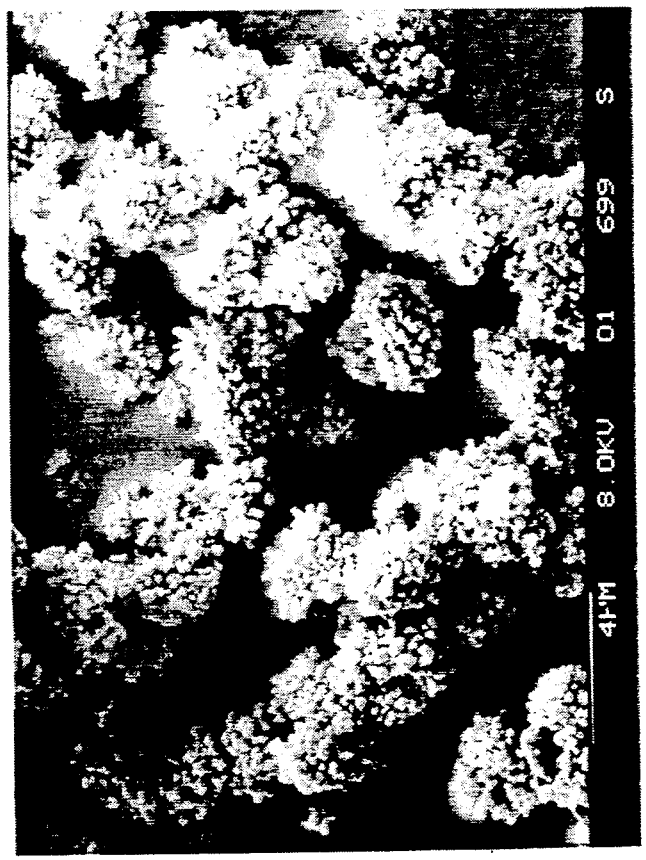
FIG. 3 is electron micrographs of desilication product crystals from precipitation studies conducted with amino tri(methylene phosphonate), sodium salt, 5,000 parts per million at 5,000 times magnification.

The present invention provides a method for modifying the composition, the morphology, and the texture of Bayer desilication products. The Bayer desilication products of the invention have a reduced tendency to adhere to process equipment surfaces.

One aspect of the instant invention involves treating Bayer Process liquors containing soluble silica species with an effective amount of at least one ammonium compound, aromatic amine compound or amine compound. The ammonium compounds of the invention generally having the following structure:

$$R_1 - \overset{\overset{R_2}{|}}{\underset{\underset{R_4}{|}}{N}} - R^{\oplus}{}_3 \; M^{\ominus}$$

wherein: $R_1$, $R_2$, $R_3$, and $R_4$ are, individually, a straight or branched chain $C_1$-$C_6$ aliphatic group, a straight or branched chain $C_1$-$C_6$ carboxyl group, a straight or branched chain $C_1$-$C_6$ hydroxyalkyl group, an aromatic group, an alkylaryl group, a hydroxyl group or a hydrogen atom; and M is an anion, such as halogen, phosphate ion, nitrate ion or hydroxyl ion. Preferably, $R_1$, $R_2$, $R_3$ and $R_4$ are, individually, a straight chain $C_1$-$C_4$ alkyl group and M is a hydroxyl ion.

Another aspect of the invention involves treating Bayer Process liquors containing soluble silica species with an effective amount of at least one amine compound having the following structure:

wherein $R_5$, $R_6$, and $R_7$ are, individually, a straight or branched chain $C_1$-$C_6$ aliphatic group, a straight or branched chain $C_1$-$C_6$ carboxyl group, a straight or branched chain $C_1$-$C_6$ hydroxyalkyl group, an aromatic group, an alkylaryl group, a hydroxyl group or a hydrogen atom. Preferably, $R_5$, $R_6$ and $R_7$ are, individually, a straight chain $C_1$-$C_4$ alkyl group or a hydrogen atom. According to one embodiment of the invention, the alkyl group is a phosphonic acid.

Another aspect of the invention provides a method of treating Bayer Process liquors containing soluble silica species with an effective amount of at least one aromatic amine compound having the following structure:

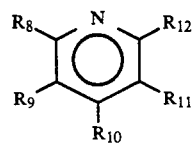

wherein $R_8$, $R_9$, $R_{10}$, $R_{11}$ and $R_{12}$ are, individually, a straight or branched chain $C_1$-$C_6$ aliphatic group, a straight or branched chain $C_1$-$C_6$ carboxyl group, a straight or branched chain $C_1$-$C_6$ hydroxyalkyl group, a hydroxyl group, or a hydrogen atom. According to one embodiment of the invention, the aromatic amine is pyridine.

It has been surprisingly discovered that the morphology and texture of the insoluble desilication products formed in the presence of any of the above-listed compounds are altered from that of the untreated desilication products. These altered desilication products exhibit rounder shapes and smoother surfaces relative to untreated samples. Such modifications of these siliceous particles are expected to confer upon them a reduced tendency to adhere to process equipment surfaces. It is also believed that inorganic scale is affected by the methods of the present invention.

According to one preferred embodiment of the invention, at least one ammonium compound selected from the group consisting of tetramethylammonium hydroxide, tetraethylammonium hydroxide, and tetrapropylammonium hydroxide is added to the Bayer Process liquor to modify the insoluble desilication products. Tetramethylammonium hydroxide and tetrapropylammonium hydroxide have been demonstrated to be highly effective in altering the morphology and texture of desilication products produced from Bayer liquors. The compounds of the invention are preferably added to the liquor as an aqueous solution in an effective dosage, although addition in an organic solvent such as methanol, or addition as a solid is acceptable. For purposes of the invention, the term "effective dosage" is that dosage of the compound which induces the formation of insoluble desilication products from Bayer liquors having modified morphological and/or chemical properties. Preferably, it is added in an effective dosage range of from about 50 to about 10,000 parts per million, and more preferably, in a range of from 100–5,000 parts per million. According to a further preferred embodiment, other ammonium compounds, such as, ammonium hydroxide, ammonium salts, choline, monoalkylammonium compounds, dialkylammonium compounds, and trialkylammonium compounds are added to the Bayer Process liquor to induce the formation of insoluble desilication products.

According to another preferred embodiment of the present invention, an amine compound, such as, amino tri(methylene)phosphonic acid (CAS No. 6419-19-8) or a salt thereof, is added to the Bayer Process liquor. The acid form of this compound has the structural formula $N[CH_2P(O)(OH)_2]_3$. The amine compounds are preferably added to the Bayer liquor as an aqueous solution at a dosage of from 50 to about 10,000 parts per million, and more preferably, they are added at a dosage of 100 to about 5,000 parts per million in the Bayer liquor. According to a further preferred embodiment of the invention, other amines, such as trialkylamines, dialkylamines and monoalkylamines are added to the Bayer Process liquor. Several amine compounds such as tripropylamine, triethylamine, hydroxylamine, and dipropylamine, have been demonstrated to be very effective in altering the morphology and texture of desilication products as described herein.

In the following examples, illustrations are provided for practicing the invention. The following examples are presented to describe preferred embodiments and utilities of the invention and are not meant to limit the invention unless otherwise stated in the claims appended hereto.

EXAMPLE 1

A sample of spent Bayer liquor with an alumina/caustic ratio of 0.29 g $Al_2O_3$/g $Na_2CO_3$ and a soluble silica content of 0.5 g $SiO_2$ per liter was employed in the experiment. To promote the formation of desilication product, the liquor was treated with sodium silicate, which raised the level of soluble silica to 3.8 g of $SiO_2$ per liter. The liquor was then treated with 2,500 parts of tetramethylammonium hydroxide per million parts of liquor. The treated liquor is heated to 450° F. in a sealed vessel for 30 minutes with mild agitation. After cooling, the contents of the vessel are removed and the solids formed by heating are separated from the liquor by vacuum filtration, and then washed. Control experiments were conducted using the same procedure but omitting the tetramethylammonium hydroxide.

The solids were examined with a scanning electron microscope. As shown in FIG. 1, in panels A, B, and C, in the presence of tetramethylammonium hydroxide, the solids which are formed are composed of spheroidal particles with diameters in the range of 1-4 microns. These spheroids are often linked to afford small clusters or chains containing several spheroids. The spheroids themselves are composed of smaller particles with dimensions of 1.0 or less microns, and which are tightly compacted. The surfaces of the spheroids are smooth and offer no outgrowths or spiney extensions which enhance the tendency for attachment of the particles to other surfaces.

Analysis of the particles by x-ray diffraction and by the energy-dispersive x-ray method indicates that they are composed primarily of a sodium aluminosilicate known as noselite, which is represented by the mole ratio formula

As shown in FIG. 2, panels A, B and C, in the absence of tetramethylammonium hydroxide, the solids which are recovered are composed of particles which exhibit irregular shapes with dimensions of approximately 2-25 microns. The particles are apparently agglomerates of smaller particles which appear at the surface as spiney outgrowths with dimensions of about 0.1-0.8 microns. The solids are composed of a mixture of sodium aluminosilicate phases which may be represented by the mole ratio formulae:

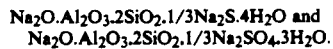

Analyses for filterable silica were conducted on the filtrates in the two experiments described in this example. In the experiment employing tetramethylammonium hydroxide, the filtrate obtained after recovery of the solids contained 0.48 grams of $SiO_2$ per liter. The control experiment showed only 0.43 grams of $SiO_2$ per liter in the filtrate. This indicates that tetramethylammonium hydroxide stabilizes the level of silica in the thermally treated liquor relative to untreated liquor. Stabilization is defined here as a reduction in the tendency of siliceous components in the liquor to form insoluble desilication products when the liquor is thermally treated.

EXAMPLE 2

A sample of Bayer liquor was treated with sodium silicate to raise the soluble silica content to 1.8 g $SiO_2$ per liter. The liquor was then treated with 5,000 parts of amino tri(methylene) phosphonic acid, per million parts of the liquor, and then heated to 450° F. for 30 minutes in a sealed vessel. The vessel was cooled to ambient temperature, and the contents were filtered to separate the solids from the liquor. As shown in FIG. 3, examination of the solids by scanning electron microscopy reveals irregular particles with diameters in the range of 2-10 microns. These particles are agglomerates of smaller particles with dimensions in the range of 0.1-0.5 microns. The size, shape, and texture of these agglomerates differ markedly from that of the Control samples in FIG. 2, panels A, B, and C.

EXAMPLE 3

Figure 4:
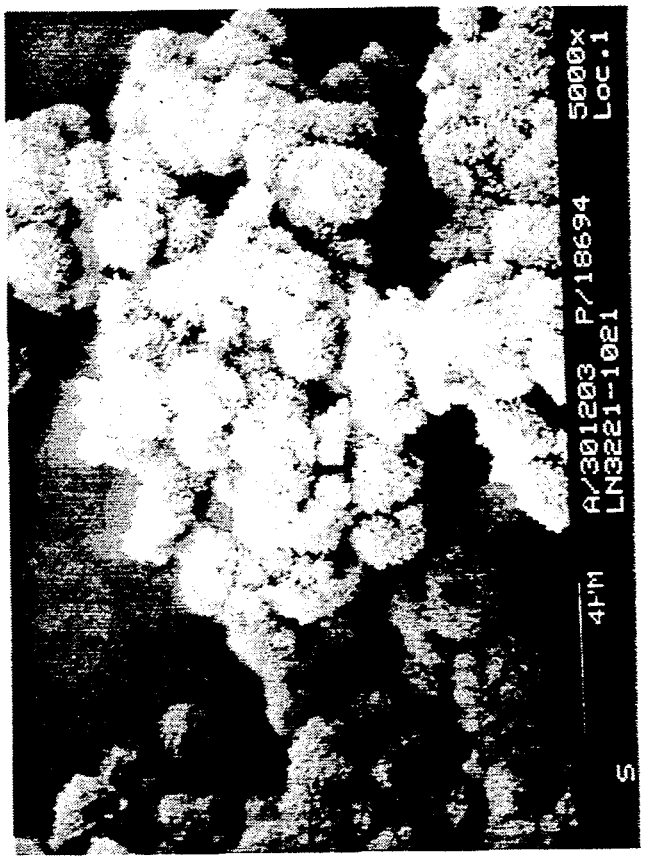
FIG. 4 is an electron micrograph of desilication product crystals from precipitation studies conducted with tetrapropylammonium hydroxide, 2,500 parts per million at 5,000 times magnification.

A sample of Bayer liquor was treated with sodium silicate to raise the level of soluble silica to 3.8 grams of $SiO_2$ per liter. The liquor was then cooled to ambient temperature and treated with 2,500 parts of tetrapropylammonium hydroxide per million parts of liquor. The treated solution was then heated to 450° F. for 30 minutes in a sealed vessel. The vessel was cooled to ambient temperature, and the contents were filtered to separate the solids from the liquor. As shown in FIG. 4, examination of the solids by scanning electron microscopy reveals spheroidal particles with diameters in the range of 1-3 microns. These spheroidal particles are further agglomerated, affording large clusters of the spheriods. As shown in FIG. 2, panels A, B, and C, the formation of these spheroid clusters is not observed in control samples prepared in the absence of tetrapropylammonium hydroxide.

EXAMPLE 4

Figure 5:
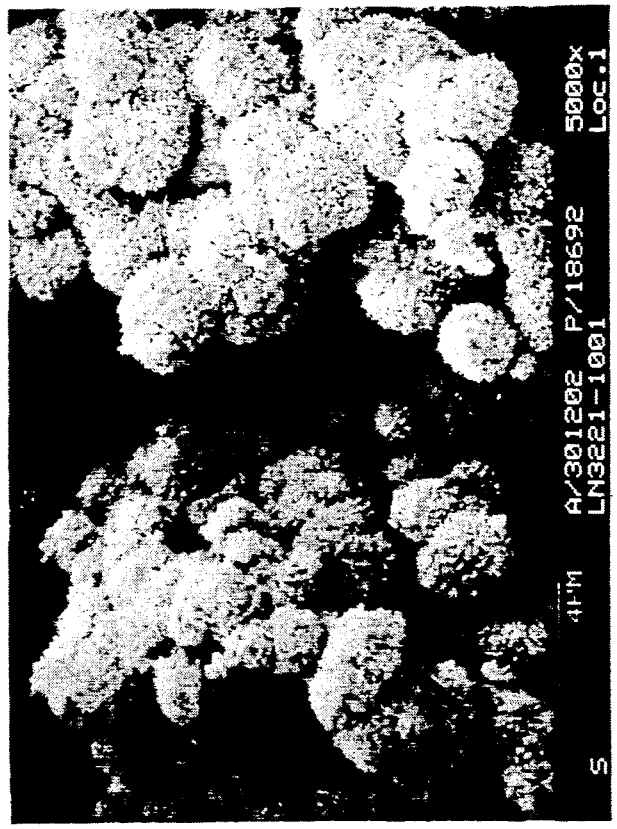

A sample of Bayer liquor was treated with sodium silicate as in Example 3. The liquor was then cooled to ambient temperature and treated with 2,500 parts of tripropylamine per million parts of liquor. The treated solution was then heated to 450° F. for 30 minutes in a sealed vessel. The vessel was cooled to ambient temperature, and the contents were filtered to separate the solids from the liquor. As shown in FIG. 5, examination of the solids by scanning electron microscopy reveals spheroidal particles with diameters in the range of 1-4 microns. These spheroidal particles are further agglomerated to afford large clusters of the spheroids. As shown in FIG. 2, the formation of these spheroid clusters is not observed in control samples prepared in the absence of tripropylamine.

EXAMPLE 5

This example was conducted as a control without the addition of soluble silica to the liquor. A sample of spent Bayer liquor was filtered to remove suspended solids and then heated to approximately 400° F. in a sealed vessel for 30 minutes. After cooling, the contents of the vessel were filtered to separate the crystallized materials from the filtrate.

Figure 6:
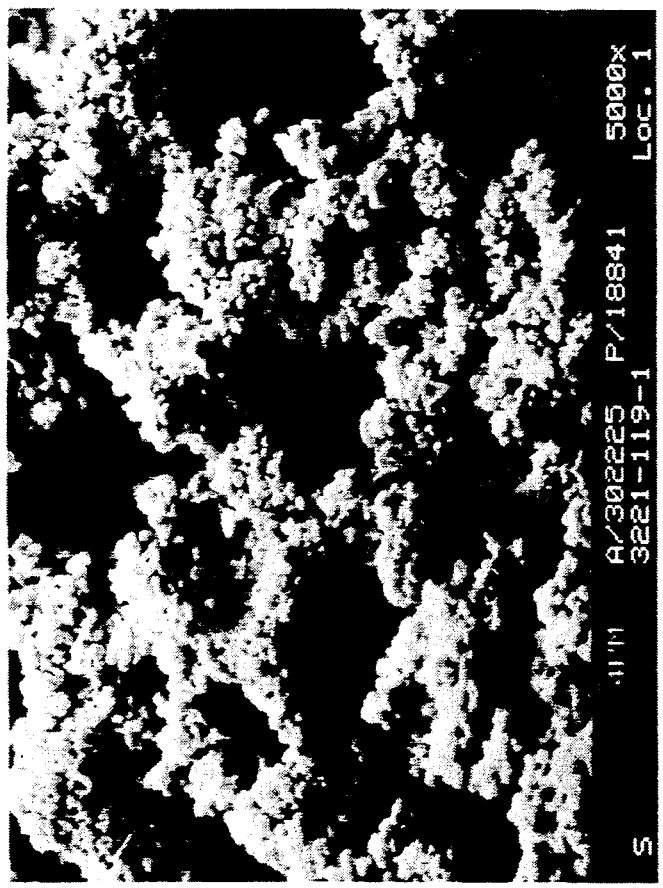
FIG. 6 is an electron micrograph of desilication product crystals from precipitation studies conducted as a control without additives, magnification 5,000 times.

The solids were examined by scanning electron microscopy, which revealed them to be irregular agglomerates of smaller crystals with dimensions of approximately 0.2 to 0.4 microns. A representative micrograph is shown in FIG. 6.

EXAMPLE 6

Figure 7B:
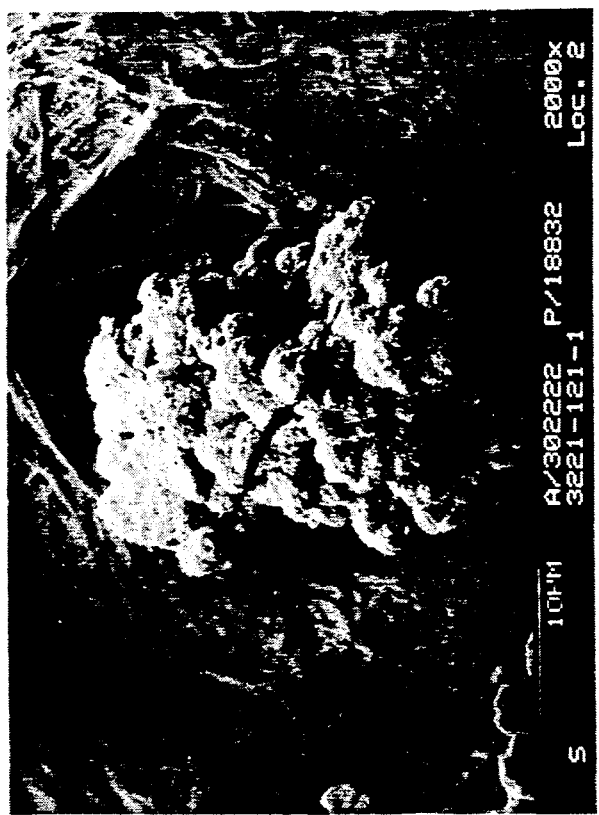
FIGS. 7A and 7B are electron micrographs of desilication product crystals from precipitation studies conducted in the presence of tetramethylammonium hydroxide, FIG. 7A 100 ppm at 5,000 magnification, FIG. 7B 500 ppm at 2,000 magnification.
Figure 7A:
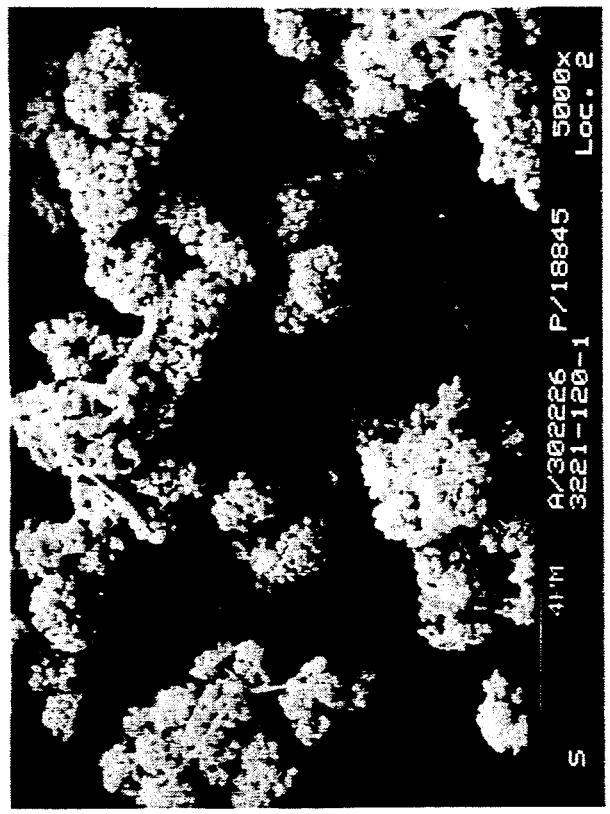

A series of experiments was conducted to demonstrate the effects of increasing dosage of tetramethylammonium hydroxide on the morphology of the desilication product. Samples of spent Bayer liquor were treated with 100 and 500 parts of tetramethylammonium hydroxide per million parts of liquor. The treated liquors were heated to approximately 400° F. for 30 minutes. After cooling, the liquors were filtered to recover the crystallized products. Examination of these products with a scanning electron micrograph indicate that at 100 ppm of the treatment, the agglomerates assumed a spheroidal shape (FIG. 7 panel A). At 500 ppm of treatment, the crystallized products are found to be clusters of highly fused spheroids (FIG. 7, panel B).

EXAMPLE 7

Figure 8:
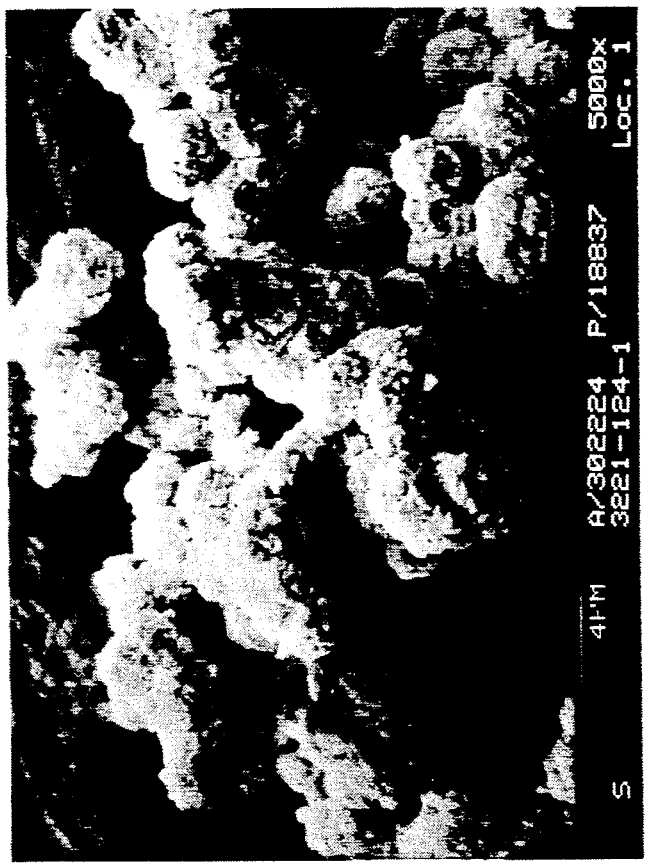
FIG. 8 is an electron micrograph of desilication product crystals from precipitation studies conducted with tetrapropylammonium hydroxide 100 ppm 5,000 magnification.

A sample of spent Bayer liquor was treated with 100 ppm of tetrapropylammonium hydroxide, and then heated to 400° F. for 30 minutes in a sealed vessel. After cooling, the liquor was filtered to collect the crystallized products. As shown in FIG. 8, examination of those solids by SEM reveals them to be agglomerates of spheroidal particles. Typical dimensions of the spheroids fall in the range of 1-2 microns.

EXAMPLE 8

Figure 9B:
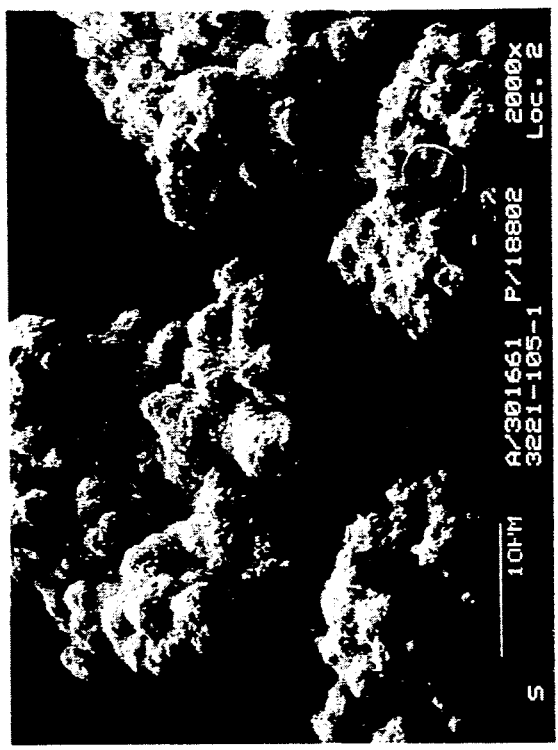
FIGS. 9A and 9B are electron micrographs of desilication product crystals from precipitation studies conducted with tetramethylammonium nitrate and tetramethylammonium bromide.
Figure 9A:
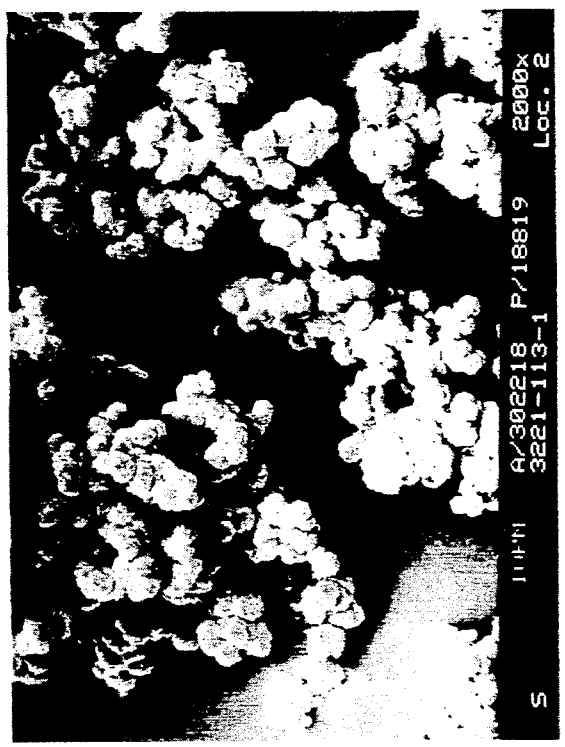

Two samples of spent Bayer liquor were treated with sodium silicate as in Example 3. The liquors were then cooled and treated with 2,500 ppm of either tetramethylammonium bromide or tetramethylammonium nitrate. The treated liquors were heated to 400° F. for 30 minutes in sealed vessels. After cooling, the liquors were filtered to collect the crystallized solids. In each case, SEM reveals the solids to be agglomerates of spheroidally shaped particles. Typical dimensions of the spheroids fall in the range 2-4 microns, with the bromide compound (FIG. 9, panel B) producing slightly larger spheroids than the nitrate compound (FIG. 9, panel A).

EXAMPLE 9

Figure 10:
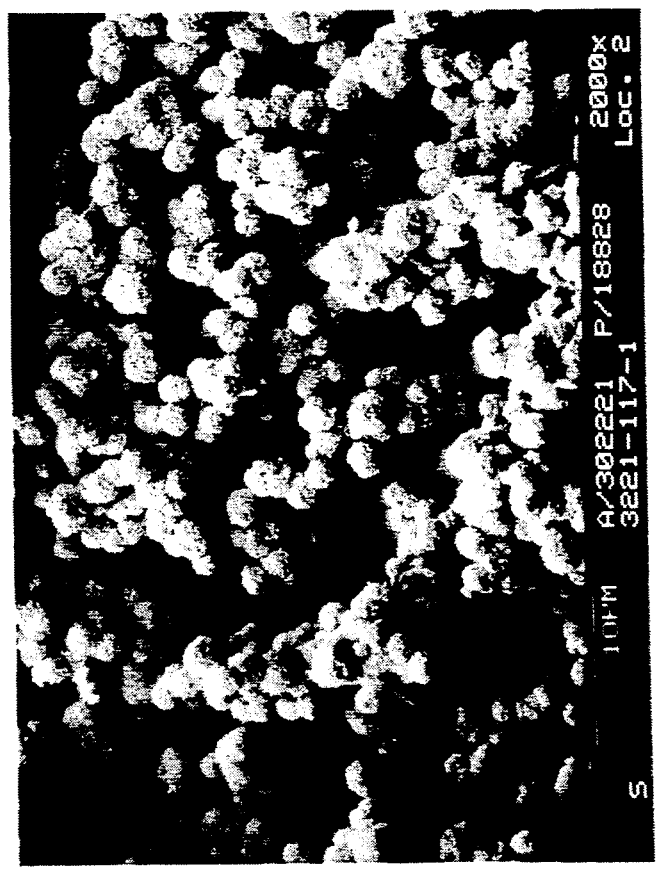

A sample of spent Bayer liquor was treated with sodium silicate as in Example 3. The liquor was then cooled and treated with 2,500 ppm of methyltributylammonium hydroxide. The treated liquor was then heated to approximately 400° F. for 30 minutes in a sealed vessel. After cooling, the liquors were filtered to collect the crystallized solids. As shown in FIG. 10, examination of the solids by SEM revealed them to be agglomerates of spheroidally-shaped particles. The diameters of the spheroids fall in the range of approximately 1-2 microns.

EXAMPLE 10

Figure 11:
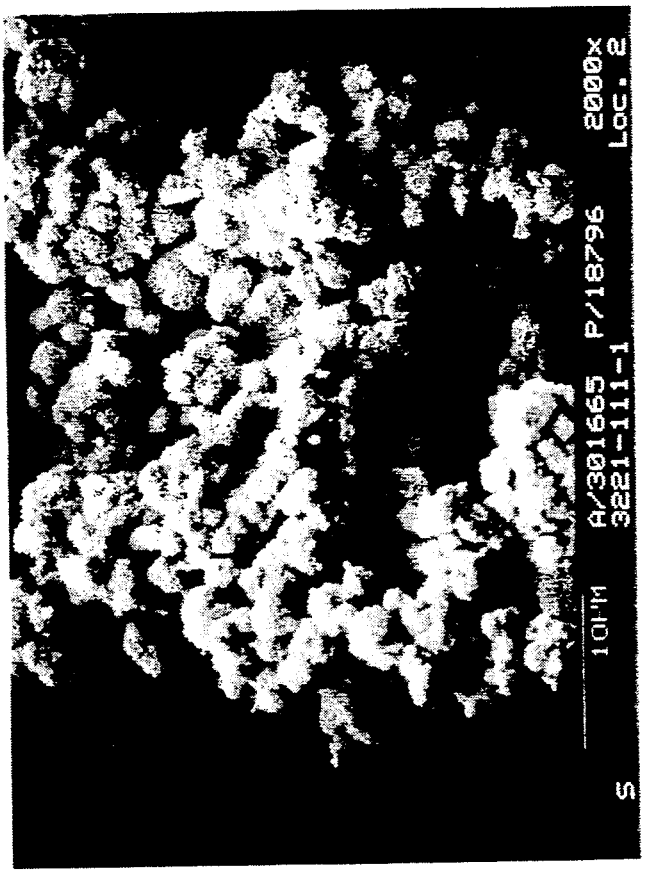
FIG. 11 is an electron micrograph of desilication product crystals from precipitation studies conducted with N-propylamine 2,500 ppm at 2,000 times magnification.

A solution of spent Bayer liquor was treated with sodium silicate as in Example 3, followed by 2,500 ppm of n-propylamine. The treated liquor was then cooled and filtered to recover the crystallized products. As shown in FIG. 11, by SEM, these solids were found to be agglomerates of spheroidally-shaped bodies with very rough texture. The diameters of the spheroids are typically 2-3 microns.

EXAMPLE 11

Figure 12:
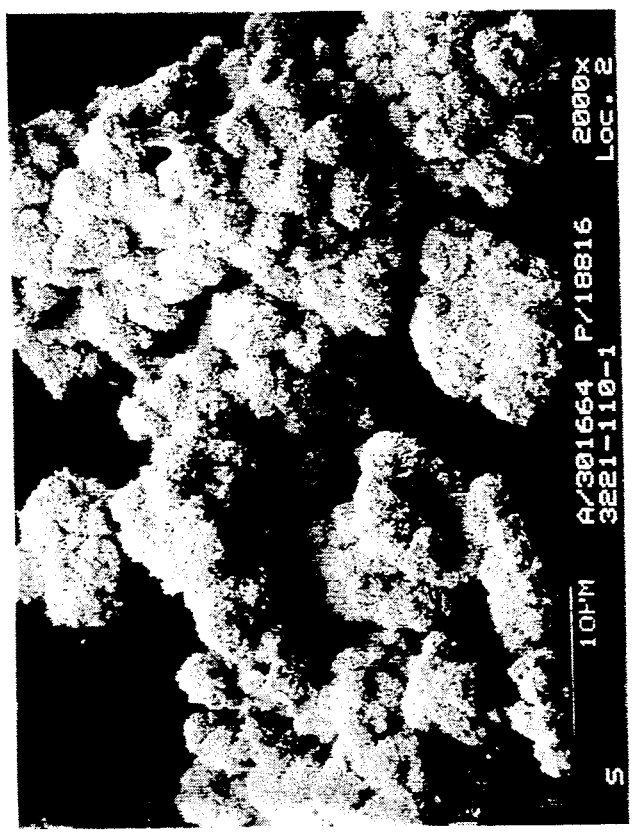
FIG. 12 is an electron micrograph of desilication product crystals from precipitation studies conducted with dipropylamine 2,500 ppm at 2,000 times magnification.

A solution of spent Bayer liquor was treated with sodium silicate as in Example 3, followed by 2,500 ppm of dipropylamine. The treated liquor was then cooled and filtered to recover the crystallized products. As shown in FIG. 12, by SEM, these solids were found to be agglomerates of spheroidally-shaped bodies. The diameters of the spheroids are typically 2-4 microns.

EXAMPLE 12

Figure 13A:
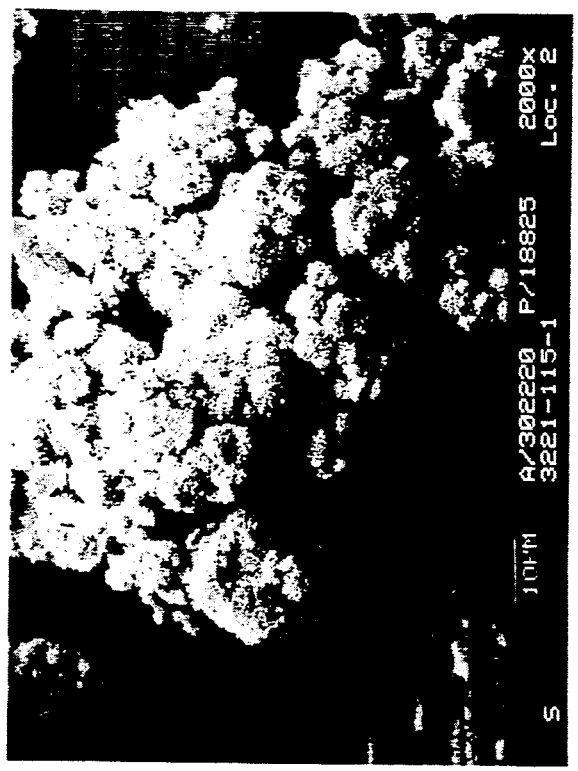
FIGS. 13A and 13B are electron micrographs of desilication product crystals from precipitation studies conducted with ammonium hydroxide and hydroxylamine, FIG. 13A ammonium hydroxide 2,500 ppm at 2,000 times magnification, FIG. 13B hydroxylamine 2,500 ppm at 2,000 times the magnification.
Figure 13B:
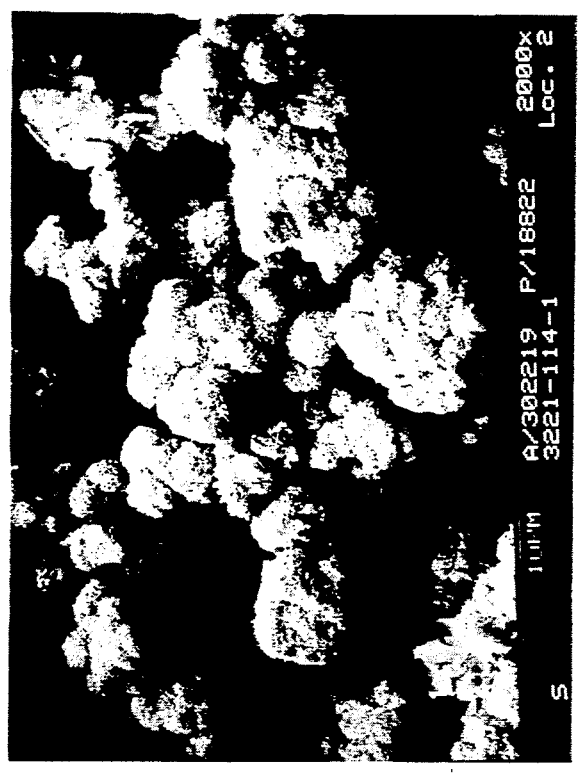

Two samples of spent Bayer liquor were treated with sodium silicate as in Example 3. The liquors were cooled and treated with 2,500 ppm of either ammonium hydroxide or hydroxylamine. The treated liquors were heated to 400° F. for 30 minutes in sealed vessels. After cooling and filtration of the reaction mixtures, the recovered solids were examined by SEM. FIG. 13, panel A, shows the spheroidal bodies formed by ammonium hydroxide application. FIG. 13, panel B, shows the spheroidal bodies formed by the treatment with hydroxylamine. As shown in FIG. 13, panels A and B, the solids are found to be agglomerates of smaller spheroidal bodies with diameters of approximately 2-4 microns.

EXAMPLE 13

Figure 14:
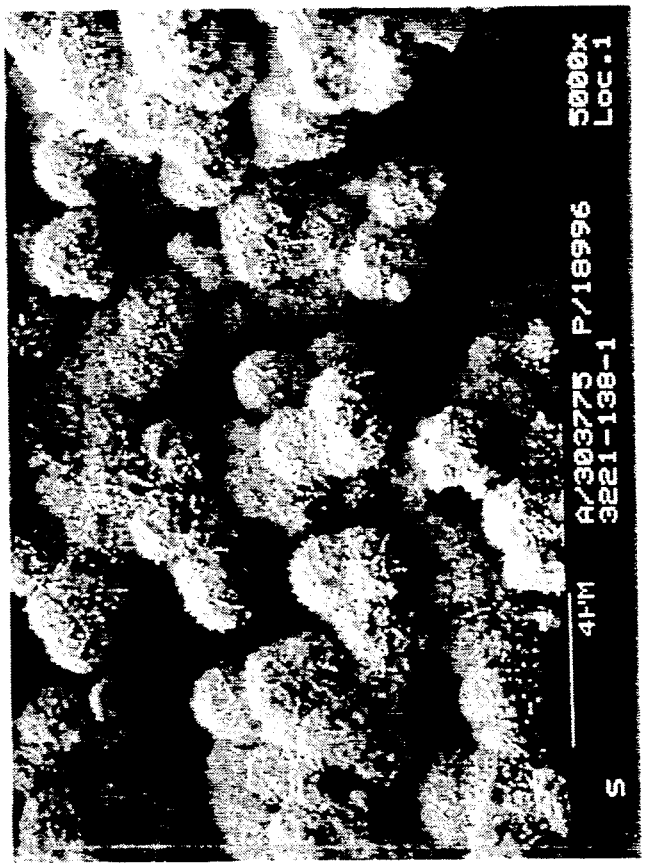
FIG. 14 is electron micrograph of desilication product crystals from precipitation studies conducted with triethylamine 2,500 ppm at 5,000 times magnification.

A sample of spent Bayer liquor was treated with sodium silicate as in Example 3. The liquor was then cooled and treated with 2,500 ppm of triethylamine. The treated liquor was then heated to approximately 400° F. for 30 minutes in a sealed vessel. After cooling, the liquors were filtered to collect the crystallized solids. Examination of the solids by SEM (FIG. 14) revealed them to be clusters of spheroidally-shaped particles. The diameters of the spheroids fall in the range of approximately 1-3 microns.

EXAMPLE 14

Figure 15:
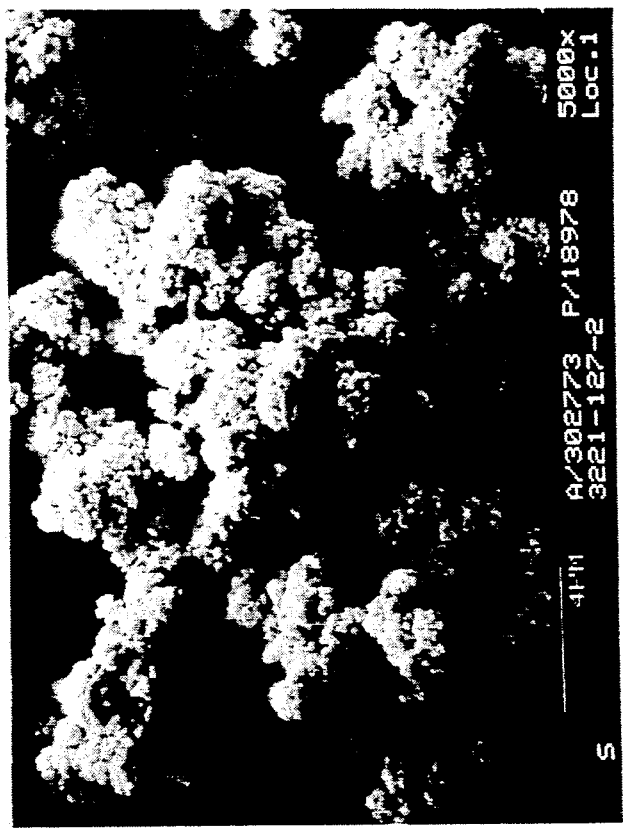
FIG. 15 is an electron micrograph of desilication product crystals from precipitation studies conducted with pyridine 100 ppm at 5,000 times magnification.

A sample of spent Bayer liquor was treated with 100 ppm of pyridine and then heated to 400° F. for 30 minutes in a sealed vessel. After cooling, the liquor was filtered to collect the crystallized products. Examination of those solids by SEM (FIG. 15) reveals them to be regular spherical agglomerates which differ in appearance from that of a blank (FIG. 6).

Changes can be made in the composition, operation and arrangement of the method of the present invention described herein without departing from the concept and scope of the invention as defined in the following claims.

I claim:

1. A method for modifying the morphological characteristics of sodium aluminosilicate crystals in a Bayer Process liquor to reduce their tendency to adhere to equipment surfaces, the method including the step of adding to the liquor from about 50 to about 10,000 parts per million of at least one compound selected from the group consisting of ammonium compounds, aromatic amine compounds and amine compounds, said ammonium compounds having the formula:

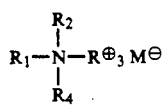

wherein: $R_1$, $R_2$, $R_3$, and $R_4$ are, individually, a straight or branched chain $C_1$–$C_6$ aliphatic group, a straight or branched chain $C_1$–$C_6$ carboxyl group, a straight or branched chain $C_1$–$C_6$ hydroxyalkyl group, an aromatic group, an alkylaryl group or a hydrogen atom; and M is an anion;

said amine compound having the formula:

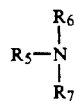

wherein $R_5$, $R_6$, and $R_7$ are, individually, a straight or branched chain $C_1$–$C_6$ aliphatic group, a straight or branched chain $C_1$–$C_6$ carboxyl group, a straight or branched chain $C_1$–$C_6$ hydroxyalkyl group, an aromatic group, an alkylaryl group, or a hydrogen atom;

and said aromatic amine compound having the following formula:

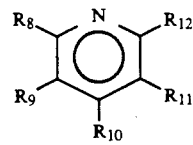

wherein $R_8$, $R_9$, $R_{10}$, $R_{11}$ and $R_{12}$ are, individually, a straight or branched chain $C_1$–$C_6$ aliphatic group, a straight or branched chain $C_1$–$C_6$ carboxyl group, a straight or branched chain $C_1$–$C_6$ hydroxyalkyl group, a hydroxyl group, or a hydrogen atom.

2. The method of claim 1 wherein $R_1$ is an alkyl group, and $R_2$, $R_3$ and $R_4$ are an alkyl group or a hydrogen atom, and M is a halogen, nitrate, phosphate or hydroxyl anion.

3. The method of claim 2 wherein the ammonium compound is a tetraalkylammonium hydroxide.

4. The method of claim 1 wherein the ammonium compound is one compound selected from the group consisting of tetramethylammonium hydroxide, tetraethylammonium hydroxide, tetrapropylammonium hydroxide and tetrabutylammonium hydroxide.

5. The method of claim 1 wherein the amine compound is one compound selected from the group consisting of a trialkylamine, a dialkylamine and a N-alkylamine compound.

6. The method of claim 1 wherein the compound added is added in a concentration of from 100 to about 5,000 parts per million in the liquor.

7. The method of claim 1 wherein the aromatic amine compound is pyridine.

8. A method of reducing the formation of insoluble sodium aluminosilicate deposits upon Bayer Process equipment during a thermal treatment of the Bayer Process liquor, the method comprising the step of adding to the liquor prior to or during the thermal treatment from about 50 to about 10,000 parts per million of at least one compound selected from the group consisting of ammonium compounds, aromatic amine compounds and amine compounds having the respective formulas:

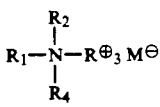

wherein: $R_1$, $R_2$, $R_3$, and $R_4$ are, individually, a straight or branched chain $C_1$–$C_6$ aliphatic group, a straight or branched chain $C_1$–$C_6$ carboxyl group, a straight or branched chain $C_1$–$C_6$ hydroxyalkyl group, an aromatic group, an alkylaryl group or a hydrogen atom; and M is an anion; and

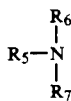

wherein $R_5$, $R_6$, and $R_7$ are, individually, a straight or branched chain $C_1$–$C_6$ aliphatic group, a straight or branched chain $C_1$–$C_6$ carboxyl group, a straight or branched chain $C_1$–$C_6$ hydroxyalkyl group, an aromatic group, an alkylaryl group, or a hydrogen atom;

and said aromatic amine compound having the following formula;

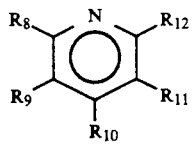

wherein $R_8$, $R_9$, $R_{10}$, $R_{11}$ and $R_{12}$ are, individually, a straight or branched chain $C_1$–$C_6$ aliphatic group, a straight or branched chain $C_1$–$C_6$ carboxyl group, a straight or branched chain $C_1$–$C_6$ hydroxyalkyl group, a hydroxyl group, or a hydrogen atom.

9. The method of claim 8 wherein the ammonium compound is a tetraalkylammonium compound.

10. The method of claim 9 wherein the ammonium compound is tetramethylammonium hydroxide.

11. The method of claim 8 wherein the ammonium compound is one compound selected from the group consisting of ammonium hydroxide, trialkylammonium hydroxide, dialkylammonium hydroxide and N-alkylammonium hydroxide compounds.

12. The method of claim 8 wherein the amine compound is one compound selected from the group consisting of hydroxylamine, N-alkylamine, dialkylamine and trialkylamine compounds.

13. The method of claim 8 wherein the compound is added in a concentration of from about 100 to about 5,000 parts per million.

14. The method of claim 8 wherein the compound is added in a concentration of from about 500 to about 2,500 parts per million.

15. The method of claim 8 wherein the aromatic amine compound is pyridine.

* * * * *